(12) United States Patent
Sakai

(10) Patent No.: US 10,465,765 B2
(45) Date of Patent: Nov. 5, 2019

(54) DAMPING FORCE ADJUSTMENT MECHANISM

(71) Applicant: AISIN SEIKI KABUSHIKI KAISHA, Kariya-shi, Aichi-ken (JP)

(72) Inventor: Kosuke Sakai, Obu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 17 days.

(21) Appl. No.: 15/812,916

(22) Filed: Nov. 14, 2017

(65) Prior Publication Data

US 2018/0156300 A1 Jun. 7, 2018

(30) Foreign Application Priority Data

Dec. 2, 2016 (JP) ................................ 2016-234713

(51) Int. Cl.
*F16F 9/50* (2006.01)
*F16F 9/18* (2006.01)
(Continued)

(52) U.S. Cl.
CPC ............... *F16F 9/50* (2013.01); *B60G 13/08* (2013.01); *B60G 17/08* (2013.01); *F16F 9/18* (2013.01);
(Continued)

(58) Field of Classification Search
CPC ........ F16F 9/18; F16F 9/34; F16F 9/50; F16F 2228/066; B60G 13/08; B60G 17/08; B60G 2202/24; B60G 2500/11
(Continued)

(56) References Cited

U.S. PATENT DOCUMENTS 5,078,240 A * 1/1992 Ackermann ............ F16F 9/465
188/282.2
6,119,831 A * 9/2000 Knecht ..................... F16F 9/46
188/282.2
(Continued)

FOREIGN PATENT DOCUMENTS

DE 10 2010 035338 A1 3/2012
JP 3 103 062 B2 8/2000
(Continued)

OTHER PUBLICATIONS

U.S. Appl. No. 16/033,433, filed Jul. 12, 2018, Kosuke Sakai.
U.S. Appl. No. 16/109,374, filed Aug. 22, 2018, Kosuke Sakai.

*Primary Examiner* — Robert A. Siconolfi
*Assistant Examiner* — San M Aung
(74) *Attorney, Agent, or Firm* — Buchanan Ingersoll & Rooney, PC

(57) ABSTRACT

A damping force adjustment mechanism includes a casing that accommodates a working fluid, a seal member that divides an interior of the casing into a first fluid chamber and a second fluid chamber, a housing that holds the seal member and is accommodated in the casing, and adjusting a damping force of the working fluid in the housing, a damping valve accommodated in the housing, a first pilot chamber and a second pilot chamber formed in the housing, a control chamber formed in the housing, a control valve dividing an interior of the control chamber into first and second control chambers, an actuator configured to electrically drive and control the control valve, first and second communication passages, first and second stationary orifices respectively provided in the first and second communication passage, and a third stationary orifice provided in a third communication passage provided in the control valve.

5 Claims, 3 Drawing Sheets

(51) Int. Cl.
  *F16F 9/34* (2006.01)
  *B60G 17/08* (2006.01)
  *B60G 13/08* (2006.01)
  *F16F 9/46* (2006.01)

(52) U.S. Cl.
  CPC .............. *F16F 9/34* (2013.01); *F16F 9/465* (2013.01); *B60G 2202/24* (2013.01); *B60G 2500/11* (2013.01); *F16F 2228/066* (2013.01)

(58) Field of Classification Search
  USPC .......................................... 188/266.2, 322.15
  See application file for complete search history.

(56) References Cited

U.S. PATENT DOCUMENTS

| 2007/0209892 | A1* | 9/2007 | Masamura | F16F 9/465 |
| | | | | 188/266 |
| 2011/0168935 | A1* | 7/2011 | Heyn | F16F 9/46 |
| | | | | 251/321 |
| 2012/0273311 | A1* | 11/2012 | Beck | F16F 9/464 |
| | | | | 188/322.15 |
| 2017/0120716 | A1 | 5/2017 | Sakai | |
| 2017/0152910 | A1* | 6/2017 | Schaffelhofer | B60G 13/08 |

FOREIGN PATENT DOCUMENTS

| JP | 4 985 984 B2 | 7/2012 |
| JP | 2017-082999 A | 5/2017 |

\* cited by examiner

DAMPING FORCE ADJUSTMENT MECHANISM

CROSS REFERENCE TO RELATED APPLICATIONS

This application is based on and claims priority under 35 U.S.C. § 119 to Japanese Patent Application 2016-234713, filed on Dec. 2, 2016, the entire contents of which are incorporated herein by reference.

TECHNICAL FIELD

This disclosure relates to a damping force adjustment mechanism, and particularly, to a damping force adjustment mechanism suitable for a shock absorber of an automobile.

BACKGROUND DISCUSSION

Some shock absorbers mounted in a vehicle have a damping force adjustment mechanism. This mechanism may adjust a damping force generated by a piston because it is impossible to satisfy ride quality and operational stability, which are in a conflicting relationship, using a shock absorber in which the damping force is uniquely determined with respect to an operating speed of the piston. Various types of damping force adjustment mechanisms have been known. For example, JP 3103062 B (Reference 1) discloses "an adjustable vibration damper for a powered vehicle, which includes a cylinder having a damping fluid therein, a piston rod sealed and inserted into the cylinder and disposed to be movable in an axial direction, a damping piston fixed to the piston rod so as to divide the cylinder into two working chambers, and a damping valve having a valve seat and configured to adjust an effective cross section of a damping duct of a main stage by a valve body movable in the axial direction, characterized in that an axially movable valve element is disposed for the purpose of positioning of the valve body in one direction, the valve element biases a back side of the valve body by pressure of the damping fluid introduced from one working chamber through a flow communication portion having a throttle whereby the valve element generates a pilot control operation in this direction with respect to the valve body, and the valve body is directly biased in another direction, and the valve body is biased by the pressure of the damping fluid in the corresponding working chamber" (see claim 1 of Reference 1, but reference numerals are omitted).

JP 4985984 (Reference 2) is to "provide a damping force adjustable shock absorber capable of generating stable damping force even in the event of a failure of an actuator", and proposes "a damping force adjustable shock absorber, which includes a cylinder having a fluid encapsulated therein, a piston provided to be slidable in the cylinder, a piston rod connected to the piston so as to extend to the outside from the cylinder, a passage in which a flow of the fluid is generated by a sliding movement of the piston in the cylinder, a pilot type damping valve configured to generate a damping force by controlling the flow of the fluid in the passage and adjust valve opening pressure with pilot pressure of a part of the flow of the fluid, a damping force adjusting valve configured to adjust the damping force by controlling a part of the flow of the fluid and adjusting the pilot pressure, and an actuator configured to operate the damping force adjusting valve, in which the damping force adjusting valve restricts the flow of the fluid in the event of a failure of the actuator, a relief valve is provided in parallel with the damping force adjusting valve, and a sub-damping valve configured to control the flow of the fluid is provided at a downstream side of the relief valve" (see Paragraphs [0010] and [0011] of Reference 2).

In the vibration damper disclosed in Reference 1, a mechanism capable of variably changing the damping force by operating the valve body by the actuator is disclosed. A control valve is disposed on the damping valve such that it is possible to control the pilot pressure of the flow of the fluid in one direction. However, the flow of the fluid in the reverse direction is controlled by directly operating the actuator. For this reason, in the event of a failure, it is necessary to set the damping force to any one of a maximum force and a minimum force. In contrast, in the case of adopting a structure including two damping valves, it is possible to control the pilot pressure of a bidirectional flow of the fluid, and as disclosed in Reference 2, the damping force characteristics in the event of a failure may be arbitrarily set. However, the number of components is increased and the size is enlarged with a complicated configuration, thereby causing a cost increase. In addition, a flow path is complicated, which makes it difficult to ensure stable failure characteristics. In particular, since a stroke amount is restricted due to the enlargement, when the shock absorber of Reference 2 is applied to a shock absorber for an automobile, stress is increased such that ride quality deteriorates.

Thus, a need exists for a damping force adjustment mechanism which is not susceptible to the drawback mentioned above.

SUMMARY

An aspect of this disclosure is directed to a damping force adjustment mechanism including a casing that accommodates a working fluid, a seal member that divides an interior of the casing into a first fluid chamber and a second fluid chamber, and a housing that holds the seal member and is accommodated in the casing, and adjusting a damping force of the working fluid in the housing. The damping force adjustment mechanism further includes: a damping valve accommodated in the housing and configured to control opening and closing a space between the first fluid chamber and the second fluid chamber; a first pilot chamber and a second pilot chamber formed in the housing and separated from each other by the damping valve; a control chamber formed in the housing and configured to communicate with the first pilot chamber and the second pilot chamber; a control valve dividing an interior of the control chamber into a first control chamber that communicates with the first pilot chamber and a second control chamber that communicates with the second pilot chamber, and configured to select a fluid flow from the first control chamber to the second control chamber or a fluid flow in a reverse direction to the fluid flow depending on magnitudes of fluid pressures in the first control chamber and the second control chamber; an actuator configured to electrically drive and control the control valve so as to control the fluid pressure in the first pilot chamber or the second pilot chamber; a first communication passage configured to cause the first fluid chamber to communicate with the second pilot chamber; a second communication passage configured to cause the second fluid chamber to communicate with the first pilot chamber; a first stationary orifice provided in the first communication passage; a second stationary orifice provided in the second communication passage; and a third stationary orifice provided in a third communication passage provided in the control valve and configured to cause the first pilot chamber and the second pilot chamber to communicate with each other when at least the actuator is not driven.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
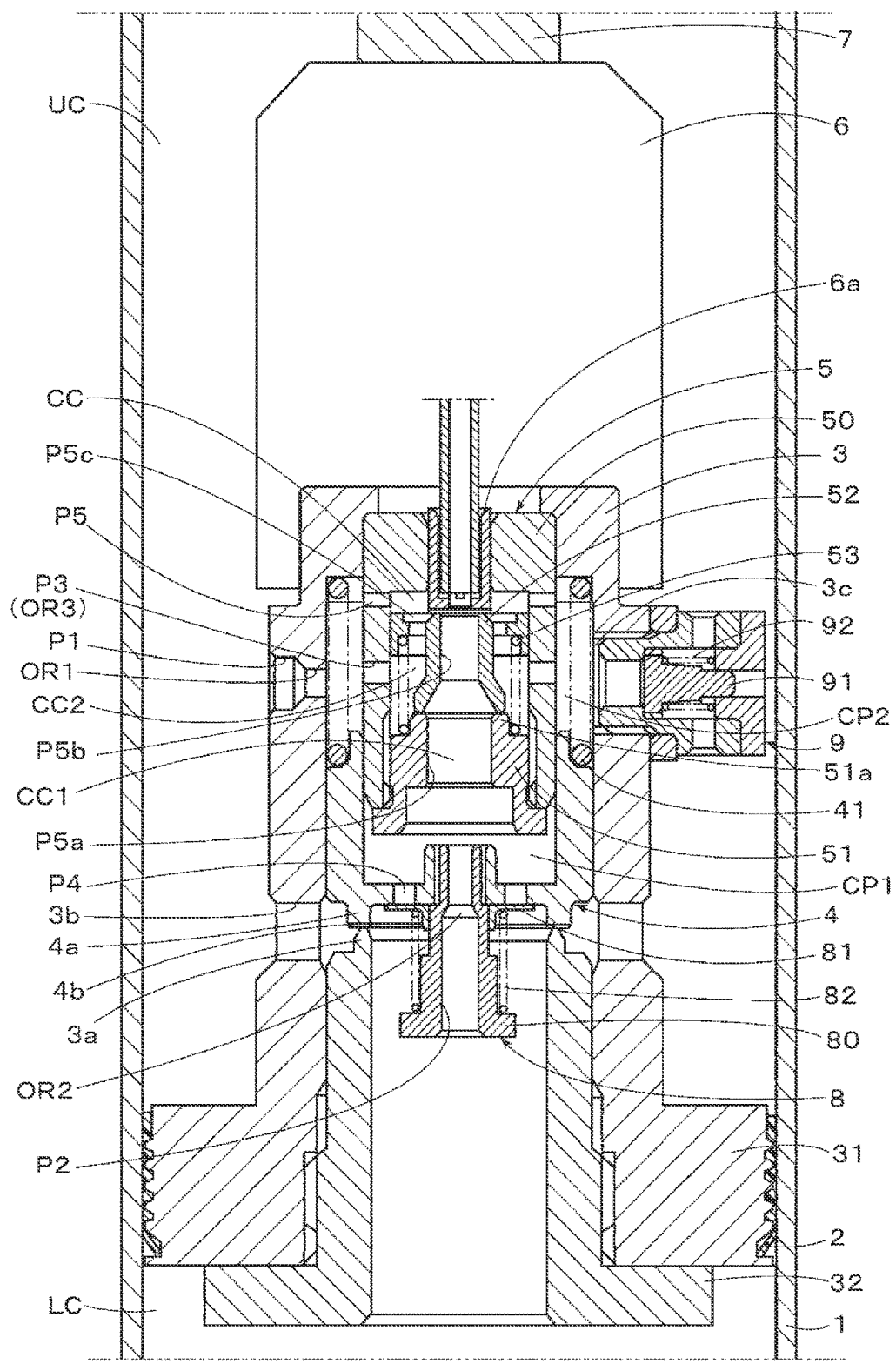
FIG. 1 is a cross-sectional view of a damping force adjustment mechanism according to an embodiment disclosed here.

Hereinafter, an embodiment disclosed here will be described with reference to the drawings. FIG. 1 illustrates a damping force adjustment mechanism according to the embodiment disclosed here, and for example, the damping force adjustment mechanism is provided in a shock absorber for an automobile. In the embodiment disclosed here, a housing 3 (corresponding to a piston of the shock absorber) is accommodated in a casing 1 (corresponding to a cylindrical body of the shock absorber) that accommodates a working fluid therein, with a seal member 2 being interposed therebetween. The interior of the casing 1 is divided, by the seal member 2, into a first fluid chamber UC (corresponding to an upper chamber of the shock absorber) and a second fluid chamber LC (corresponding to a lower chamber of the shock absorber), and an actuator 6 and a rod 7 are joined to the housing 3. A damping valve 4, which controls opening and closing of a space between the first fluid chamber UC and the second fluid chamber LC, is accommodated in the housing 3, and a first pilot chamber CP1 and a second pilot chamber CP2 are separated from each other by the damping valve 4.

In the embodiment disclosed here, a first communication passage P1, which causes the first fluid chamber UC to communicate with the second pilot chamber CP2, is provided in the housing 3. A second communication passage P2, which causes the second fluid chamber LC to communicate with the first pilot chamber CP1, is formed in a hollow cylindrical body 80 of a first relief valve 8 to be described below. Further, a first stationary orifice OR1 (hereinafter, simply referred to as an "orifice OR1") is provided in the first communication passage P1, and a second stationary orifice OR2 (hereinafter, simply referred to as an "orifice OR2") is provided in the second communication passage P2. Further, a third stationary orifice OR3 is provided in a third communication passage P3 to be described below. In addition, the orifices OR1, OR2, and OR3 do not have to be formed integrally with the housing 3 or the like, and may be configured in separate members.

In the embodiment disclosed here, an annular valve seat portion 3a is formed at the second fluid chamber LC side of the housing 3, the damping valve 4 is formed in a cup shape of a bottomed cylindrical body, the damping valve 4 is accommodated in the housing 3 such that a bottom surface of the damping valve 4 may come into contact with and may be seated on the valve seat portion 3a, and supported to be slidable by a predetermined axial distance. In addition, a damping valve spring 41, which is a compressive coil spring, is accommodated in the housing 3, and extends between the bottom portion of the housing 3 and the end portion of the sidewall of the damping valve 4. Further, an annular vertical wall portion 4a is formed outside the bottom surface of the damping valve 4, a slit 4b is formed in a radial direction of the vertical wall portion 4a, and a fourth communication passage P4 is formed in a bottom portion inside the vertical wall portion 4a. Further, an annular space (fluid chamber), which includes an abutment portion between the vertical wall portion 4a and the valve seat portion 3a, is configured to communicate with the first fluid chamber UC through a plurality of communication holes 3b provided in the housing 3. Therefore, the first fluid chamber UC and the second fluid chamber LC may be configured to communicate with each other through the communications holes 3b and the slit 4b even in a state in which the vertical wall portion 4a and the valve seat portion 3a are in contact with each other. In addition, as illustrated in FIG. 1, the housing 3 of the embodiment disclosed here includes two members including a cylindrical main body portion 31 and a plug member 32, and the valve seat portion 3a is formed at the opening end of the plug member 32.

In this way, the first pilot chamber CP1 having variable capacity is formed between the inner surface of the damping valve 4 and the end surface of a control valve 5 to be described below, and the second pilot chamber CP2 having variable capacity is defined by the end surfaces of the sidewall of the damping valve 4, the outer surface of the control valve 5, and the inner surface of the housing 3. Further, a control chamber CC, which communicates with the first and second pilot chambers CP1 and CP2, is formed in the housing 3, and the interior of the control chamber CC is divided, by the control valve 5, into a first control chamber CC1 which communicates with the first pilot chamber CP1, and a second control chamber CC2 which communicates with the second pilot chamber CP2. Further, a flow of the fluid from the first control chamber CC1 to the second control chamber CC2 or a flow of the fluid in the reverse direction is selected by the control valve 5 based on the magnitudes of fluid pressures in the first control chamber CC1 and the second control chamber CC2. In addition, the control valve 5 is electrically driven and controlled by the actuator 6, and the fluid pressure in the first pilot chamber CP1 or the second pilot chamber CP2 is controlled as described below.

The control valve 5 of the embodiment disclosed here includes a holding member 50 which is a bottomed cylindrical body disposed in the housing 3 and having the third communication passage P3, a first member 51 disposed at the first pilot chamber CP1 side of the holding member 50 and having a flow path P5a (for defining a first flow path) that causes the first control chamber CC1 to communicate with the first pilot chamber CP1, and a second member 52 disposed at the side of the second control chamber CC2 so as to come into contact with the first member 51, and having flow paths P5b and P5c that cause the second control chamber CC2 to communicate with the second pilot chamber CP2. The second member 52 is operated by the actuator 6. The second member 52 is fitted into the holding member 50 in a liquid-tight manner, and the second member 52 is slidably accommodated in the holding member 50. Further, the first control chamber CC1 and the second control chamber CC2 are configured to communicate with each other through a gap between the first member 51 and the second member 52. Further, a fifth communication passage P5 (for defining a second flow path) is formed in the sidewall in the vicinity of the bottom portion of the holding member 50, a bottom space between the holding member 50 and the second member 52 communicates with the second pilot chamber CP2 through the fifth communication passage P5, and the fifth communication passage P5 is blocked by the sidewall portion of the second member 52 when the second member 52 comes into contact with the bottom portion in the holding member 50. Therefore, after the fifth communication passage P5 is blocked, the second control chamber CC2 communicates with the second pilot chamber CP2 only through the third communication passage P3 (for defining the third stationary orifice).

As illustrated in FIG. 1, the first member 51 and the second member 52 have the same diameter, but the flow path P5a (for defining the first flow path) is formed in the first member 51, and the flow paths P5b and P5c are formed in the second member 52. In addition, an annular vertical wall 51a is formed on the upper end surface of the first member 51, and the second control chamber CC2 is formed outside the vertical wall 51a such that the first control chamber CC1 is formed in the first member 51 and the second member 52 when the lower end surface of the second member 52 comes into contact with the vertical wall 51a of the first member 51. Therefore, pressure receiving areas of the first and second members 51 and 52 are different from each other even in a case in which the fluid flows in any direction toward the first member 51 and the second member 52, and a gap is formed between the first and second members 51 and 52 by a pressure difference between the first and second members 51 and 52, which is generated by the fluid. Further, a return spring 53, which biases the first and second members 51 and 52 in a direction in which the first and second members 51 and 52 are spread and opened, is interposed between the first member 51 and the second member 52, and by the return spring 53, the second member 52 is biased in the direction toward the bottom portion of the holding member 50, and the upper end surface of the second member 52 is biased to be in contact with a plunger 6a of the actuator 6. The actuator 6 of the embodiment disclosed here includes a linear solenoid (not illustrated) mounted in the housing 3, and the plunger 6a which operates to press the second member 52 in response to excitation of the linear solenoid.

In the embodiment disclosed here, the first relief valve 8 and a second relief valve 9 are disposed. The first relief valve 8 includes the hollow cylindrical body 80 having an orifice OR2 in an axial interior thereof, a valve member 81 disposed to be able to close an opening of the fourth communication passage P4, and a relief spring 82 configured to bias the valve member 81 in the direction in which the opening of the fourth communication passage P4 is blocked. Meanwhile, the second relief valve 9 has a valve member 91 disposed to be able to close an opening 3c of the housing 3 that communicates with the second pilot chamber CP2, and a relief spring 92 configured to bias the valve member 91 in the direction in which the opening 3c is blocked. In addition, a valve seat member (reference numeral thereof is omitted), which constitutes the relief valve 9, is mounted in the opening 3c illustrated in FIG. 1, and the valve member 91 is disposed to be able to be seated on the valve seat member, and the opening 3c is blocked when the valve member 91 is seated.

The operation of the damping force adjustment mechanism configured as described above will be described. For example, when the rod 7 is moved upward in FIG. 1 (e.g., the extension operation of the shock absorber) from the excited state of the solenoid of the actuator 6 illustrated in FIG. 1, and the housing 3 begins to compress the interior of the first fluid chamber UC, the fluid in the first fluid chamber UC is introduced into the housing 3 from the first communication passage P1 through the orifice OR1 (with a pressure loss), and as indicated by thin arrows f1 in FIG. 2, the fluid is discharged toward the second fluid chamber LC through the second pilot chamber CP2, the third communication passage P3, the fifth communication passage P5, the second control chamber CC2, the gap between the plunger 6a and the second member 52, the first control chamber CC1, the first pilot chamber CP1, the orifice OR2, and the second communication passage P2. In this case, the valve member 81 of the first relief valve 8 is in the opened state against the biasing force of the relief spring 82. In addition, in FIG. 2 (and FIG. 3), because the extension line intersects the arrows indicating the flow of the fluid, some reference numerals indicated in FIG. 1 are omitted.

Figure 2:
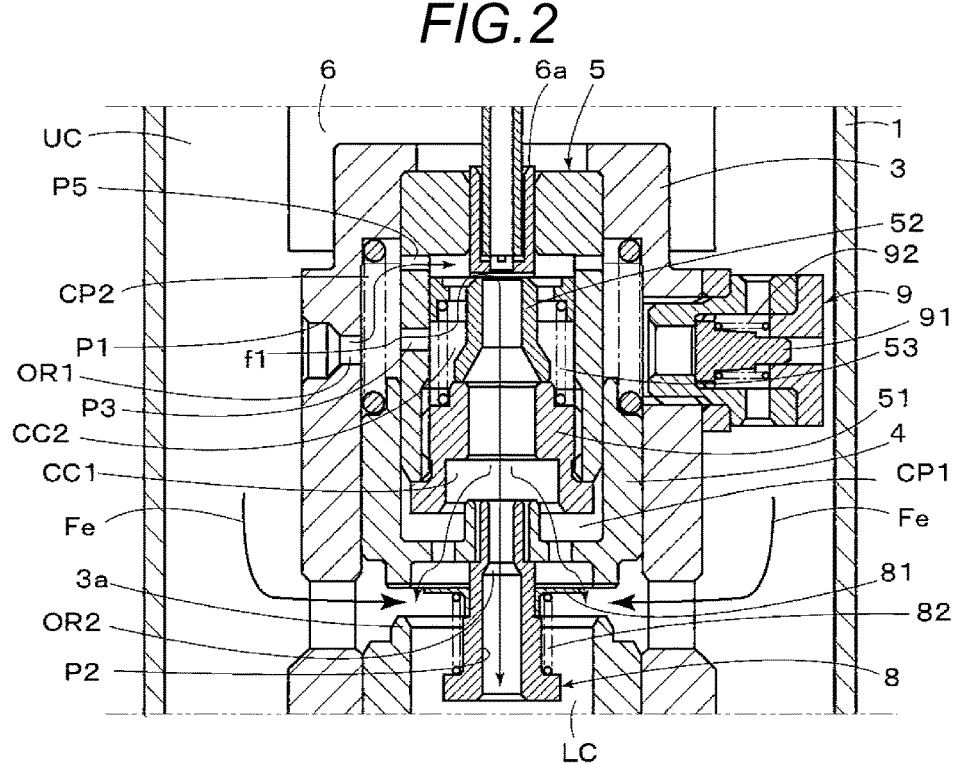
FIG. 2 is a cross-sectional view illustrating a usual extension operation state according to the embodiment disclosed here.

When the flow rate of the fluid, which is introduced into the housing 3 from the first fluid chamber UC, is increased in accordance with an increase in upward movement speed of the rod 7 (in addition to the housing 3), the damping valve 4 is separated from the valve seat portion 3a against the biasing force of the damping valve spring 41 by a difference between the pressures of the fluid applied to both surfaces of the bottom portion of the damping valve 4, and as indicated by thick arrows Fe in FIG. 2, the fluid is discharged toward the second fluid chamber LC from the gap between the damping valve 4 and the valve seat portion 3a. In this case, the control valve 5 is operated by the actuator 6, and the pressure in the second pilot chamber CP2 is controlled such that the valve opening pressure of the damping valve 4 is variably controlled and adjusted to have desired damping force characteristics (pressure-flow rate characteristics).

Figure 3:
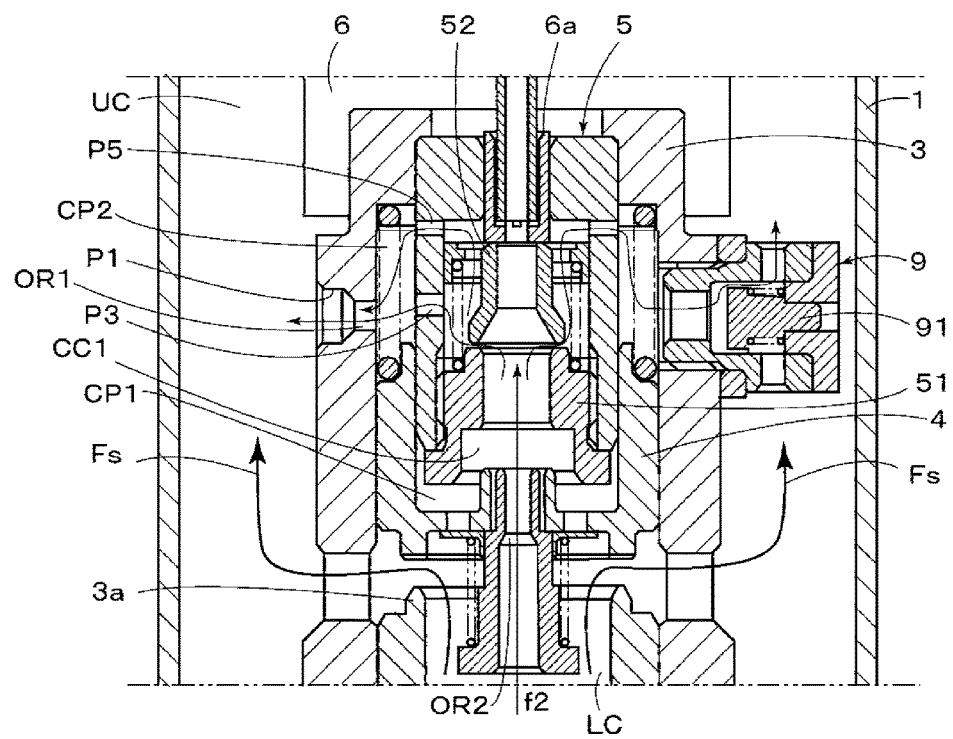
FIG. 3 is a cross-sectional view illustrating a usual contraction operation state according to the embodiment disclosed here.

In contrast, when the rod 7 is moved downward in FIG. 1 (e.g., the contraction operation of the shock absorber) and the housing 3 begins to compress the interior of the second fluid chamber LC, the fluid in the second fluid chamber LC is introduced into the first pilot chamber CP1 through the orifice OR2 (with a pressure loss), and as indicated by thin arrows f2 in FIG. 3, the fluid is discharged toward the first fluid chamber UC through the first pilot chamber CP1, the first control chamber CC1, the gap between the first and second members 51 and 52, the second control chamber CC2, the third communication passage P3, the fifth communication passage P5, the second pilot chamber CP2, the orifice OR1, and the first communication passage P1, and discharged toward the first fluid chamber UC through the second relief valve 9 (the valve member 91 is in the opened state).

When the flow rate of the fluid, which is introduced into the housing 3 from the second fluid chamber LC, is increased in accordance with an increase in downward movement speed of the rod 7 (housing 3), the damping valve 4 is separated from the valve seat portion 3a against the biasing force of the damping valve spring 41 by a difference between the pressures of the fluid applied to both surfaces of the bottom portion of the damping valve 4, and as indicated by thick arrows Fs in FIG. 3, the fluid is discharged toward the first fluid chamber UC from the gap between the damping valve 4 and the valve seat portion 3a. Even in this case, the control valve 5 is operated by the actuator 6, and the pressure in the second pilot chamber CP2 is controlled such that the valve opening pressure of the damping valve 4 is variably controlled and adjusted to desired pressure-flow rate characteristics. Thus, the pressure-flow rate characteristics at the time of initiating the extension operation at which the rod 7 is moved upward and the pressure-flow rate characteristics at the time of initiating the contraction operation at which the rod 7 is moved downward are different from each other such that it is possible to set the initial characteristics to be suitable for the respective operations.

In both of the cases illustrated in FIGS. 2 and 3, the pressure loss caused by the orifices OR1 and OR2 needs to be prevented from being generated while the fluid introduced into the housing 3 is discharged, and as a result, while the fluid is discharged, the valve members 81 and 91 are opened against the biasing force of the relief springs 82 and 92 by the difference between the pressures applied to the valve members 81 and 91 of the first and second relief valves 8 and 9 and the flow path area is increased (accordingly, flow path resistance is decreased).

Figure 4:
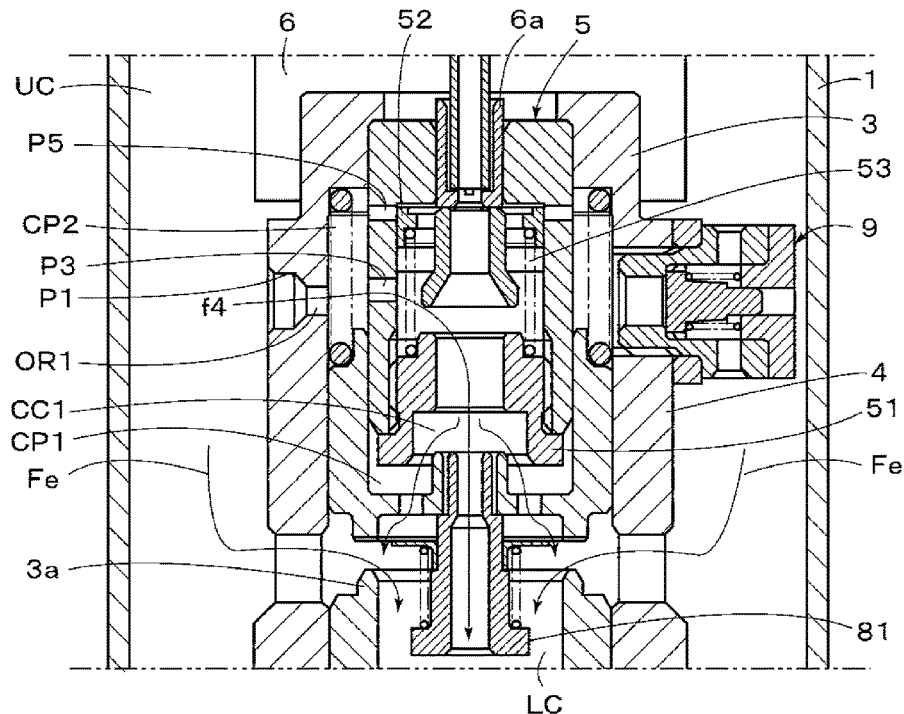
FIG. 4 is a cross-sectional view illustrating an extension operation state in the event of a failure according to the embodiment disclosed here.
Figure 5:
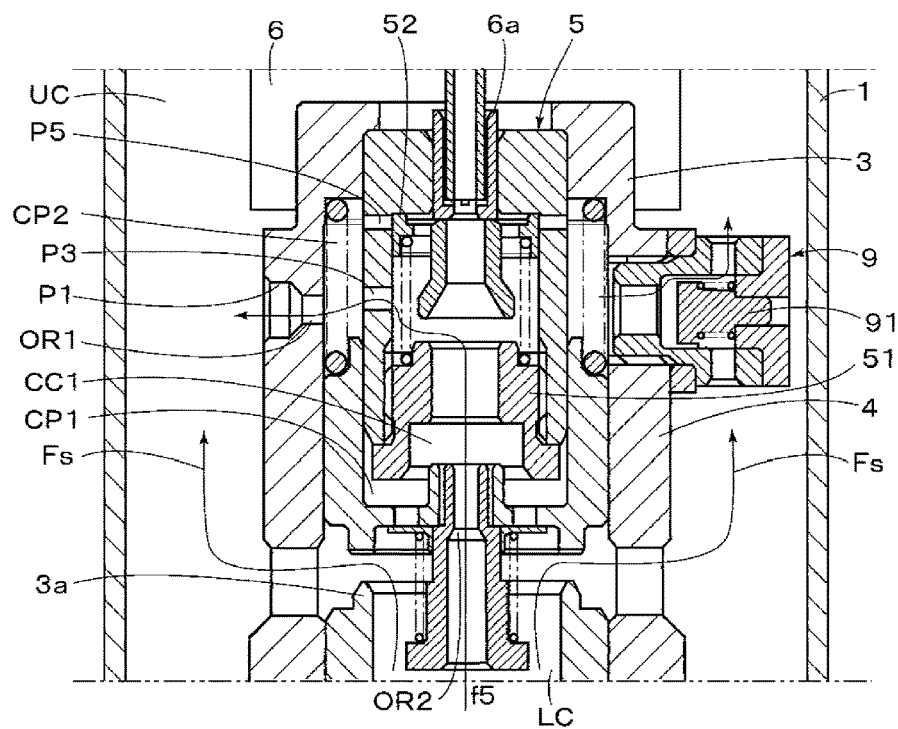
FIG. 5 is a cross-sectional view illustrating a contraction operation state in the event of a failure according to the embodiment disclosed here.

FIGS. 4 and 5 illustrate states in the event of a failure according to the embodiment disclosed here, and when the linear solenoid is not excited (in the event of a failure), the second member 52 and the plunger 6a are pressed upward in FIG. 4 by the biasing force of the return spring 53, and the fifth communication passage P5 is blocked by the sidewall portion of the second member 52. Further, the third communication passage P3 serves as the third orifice OR3 after the fifth communication passage P5 is blocked, and as a result, it is possible to arbitrarily set the pilot pressure in the event of a failure. As described above, the communication state is maintained through the third communication passage P3 (third orifice OR3) even in the event of a failure, and as a result, it is possible to ensure the flows of the fluid (indicated by thin arrows f4 and f5) through the same third communication passage P3 either when the extension operation of moving the rod 7 upward is initiated or when the contraction operation moving the rod 7 downward is initiated.

In particular, the failure characteristics may be arbitrarily set only by the dimension precision of the third orifice OR3, and as a result, the state in the event of a failure is stabilized. In addition, in order to minimize a flow path pressure loss in a situation in which it is difficult to ensure the stroke of the second member 52, for example, the fifth communication passage P5, which is formed in the holding member 50, may have a long hole shape having a long length in the circumferential direction of the holding member 50 to minimize the stroke amount of the second member 52.

In the embodiment described above, the damping force adjustment mechanism is configured such that the casing 1 is configured as a cylindrical body of the shock absorber for accommodating the working fluid therein, the housing 3 is configured as a piston for dividing the interior of the cylindrical body into the first fluid chamber UC (upper chamber) and the second fluid chamber LC (lower chamber) while sliding in the cylindrical body, and the seal member 2 is configured as a seal member mounted on the piston such that the damping force is adjusted by controlling the working fluid flowing through the piston in the cylindrical body, and thus the damping force adjustment mechanism is suitable for a shock absorber. However, the damping force adjustment mechanism may be applied to various types of dampers, separate pressure devices, or the like without being limited to a shock absorber or an automobile.

An aspect of this disclosure is directed to a damping force adjustment mechanism including a casing that accommodates a working fluid, a seal member that divides an interior of the casing into a first fluid chamber and a second fluid chamber, and a housing that holds the seal member and is accommodated in the casing, and adjusting a damping force of the working fluid in the housing. The damping force adjustment mechanism further includes: a damping valve accommodated in the housing and configured to control opening and closing a space between the first fluid chamber and the second fluid chamber; a first pilot chamber and a second pilot chamber formed in the housing and separated from each other by the damping valve; a control chamber formed in the housing and configured to communicate with the first pilot chamber and the second pilot chamber; a control valve dividing an interior of the control chamber into a first control chamber that communicates with the first pilot chamber and a second control chamber that communicates with the second pilot chamber, and configured to select a fluid flow from the first control chamber to the second control chamber or a fluid flow in a reverse direction to the fluid flow depending on magnitudes of fluid pressures in the first control chamber and the second control chamber; an actuator configured to electrically drive and control the control valve so as to control the fluid pressure in the first pilot chamber or the second pilot chamber; a first communication passage configured to cause the first fluid chamber to communicate with the second pilot chamber; a second communication passage configured to cause the second fluid chamber to communicate with the first pilot chamber; a first stationary orifice provided in the first communication passage; a second stationary orifice provided in the second communication passage; and a third stationary orifice provided in a third communication passage provided in the control valve and configured to cause the first pilot chamber and the second pilot chamber to communicate with each other when at least the actuator is not driven.

The damping force adjustment mechanism may be configured such that the control valve includes: a holding member disposed in the housing and having the third stationary orifice; a first member disposed at the first pilot chamber side of the holding member and having a flow path configured to cause the first control chamber to communicate with the first pilot chamber; and a second member disposed at the second control chamber side to be in contact with the first member and having a flow path that causes the second control chamber to communicate with the second pilot chamber, the second member being configured to be driven by the actuator, and the first control chamber and the second control chamber are configured to communicate with each other through a gap between the second member and the first member, and the first pilot chamber and the second pilot chamber communicate with each other through the third stationary orifice when the actuator is not driven.

The damping force adjustment mechanism may be configured such that the holding member is a bottomed cylindrical body having the third stationary orifice in a sidewall portion thereof, the first member is disposed at an opening end side of the holding member and has a first flow path configured to cause the first control chamber to communicate with the first pilot chamber, the second member is slidably accommodated in the holding member so as to be disposed to come into contact with a bottom portion of the bottomed cylindrical body and the first member, and has a second flow path that causes the first pilot chamber to communicate with the second pilot chamber when a bottom portion space is formed in the bottomed cylindrical body, and when the second member comes into contact with the bottom portion in the bottomed cylindrical body, the second flow path is blocked by the second member, and the first pilot chamber and the second pilot chamber communicate with each other only through the third stationary orifice, and a return spring is interposed between the first member and the second member to bias the first member and the second member in a direction in which the space between the first member and the second member is spread and opened.

The damping force adjustment mechanism may be configured such that the damping force adjustment mechanism further includes: a first relief valve having a valve member disposed to block an opening of a fourth communication passage formed in the damping valve, and a relief spring configured to bias the valve member in a direction in which the valve member blocks the opening of the fourth communication passage; and a second relief valve having a valve member disposed to block an opening of the housing configured to communicate with the second pilot chamber, and a second relief spring configured to bias the valve member in a direction in which the valve member blocks the opening of the housing.

The damping force adjustment mechanism may be configured such that the actuator includes a linear solenoid mounted in the housing, and a plunger configured to operate the second member in response to excitation of the linear solenoid.

The damping force adjustment mechanism may be configured such that the casing is configured as a cylindrical body that accommodates the working fluid therein, the housing and the seal member are respectively configured by a piston that slides in the cylindrical body and divides an interior of the cylindrical body into an upper chamber, which is the first fluid chamber, and a lower chamber, which is the second fluid chamber, and a seal member which is mounted on the piston, and a damping force is adjusted by controlling the working fluid that flows through the piston in the cylindrical body.

Since the aspect of this disclosure is configured as described above, this disclosure has the following effects. That is, the damping force adjustment mechanism of this disclosure includes: a damping valve accommodated in the housing and configured to control opening and closing a space between the first fluid chamber and the second fluid chamber; a first pilot chamber and a second pilot chamber formed in the housing and separated from each other by the damping valve; a control chamber formed in the housing and configured to communicate with the first pilot chamber and the second pilot chamber; a control valve dividing an interior of the control chamber into a first control chamber that communicates with the first pilot chamber and a second control chamber that communicates with the second pilot chamber, and configured to select a fluid flow from the first control chamber to the second control chamber or a fluid flow in a reverse direction to the fluid flow depending on magnitudes of fluid pressures in the first control chamber and the second control chamber; an actuator configured to electrically drive and control the control valve so as to control the fluid pressure in the first pilot chamber or the second pilot chamber; a first communication passage configured to cause the first fluid chamber to communicate with the second pilot chamber; a second communication passage configured to cause the second fluid chamber to communicate with the first pilot chamber; a first stationary orifice provided in the first communication passage; a second stationary orifice provided in the second communication passage; and a third stationary orifice provided in a third communication passage provided in the control valve and configured to cause the first pilot chamber and the second pilot chamber to communicate with each other when at least the actuator is not driven. As such, it is possible to ensure desired damping force characteristics by controlling the pilot pressure of the bidirectional flow of the fluid with a simple configuration having a single damping valve. Furthermore, it is possible to arbitrarily set the failure characteristics only by the dimension precision of the third orifice, and as a result, it is possible to ensure stable failure characteristics.

When the damping force adjustment mechanism is configured such that the control valve includes: a holding member disposed in the housing and having the third stationary orifice; a first member disposed at the first pilot chamber side of the holding member and having a flow path configured to cause the first control chamber to communicate with the first pilot chamber; and a second member disposed at the second control chamber side to be in contact with the first member and having a flow path that causes the second control chamber to communicate with the second pilot chamber, the second member being configured to be driven by the actuator, and the first control chamber and the second control chamber are configured to communicate with each other through a gap between the second member and the first member, and the first pilot chamber and the second pilot chamber communicate with each other through the third stationary orifice when the actuator is not driven, it is possible to ensure stable failure characteristics with the simple configuration.

When the damping force adjustment mechanism is configured such that the holding member is a bottomed cylindrical body having the third stationary orifice in a sidewall portion thereof, the first member is disposed at an opening end side of the holding member and has a first flow path configured to cause the first control chamber to communicate with the first pilot chamber, the second member is slidably accommodated in the holding member so as to be disposed to come into contact with a bottom portion of the bottomed cylindrical body and the first member, and has a second flow path that causes the first pilot chamber to communicate with the second pilot chamber when a bottom portion space is formed in the bottomed cylindrical body, and when the second member comes into contact with the bottom portion in the bottomed cylindrical body, the second flow path is blocked by the second member, and the first pilot chamber and the second pilot chamber communicate with each other only through the third stationary orifice, and a return spring is interposed between the first member and the second member to bias the first member and the second member in a direction in which the space between the first member and the second member is spread and opened, the second flow path is blocked by the sidewall portion of the second member by the return spring in the event of a failure, and thereafter, the first pilot chamber and the second pilot chamber communicate with each other only through the third stationary orifice. Thus, it is possible to ensure the pilot pressure through the third stationary orifice, and to ensure stable failure characteristics.

When the damping force adjustment mechanism is configured to include a first relief valve having a valve member disposed to block an opening of a fourth communication passage formed in the damping valve, and a relief spring configured to bias the valve member in a direction in which the valve member blocks the opening of the fourth communication passage; and a second relief valve having a valve member disposed to block an opening of the housing configured to communicate with the second pilot chamber, and a second relief spring configured to bias the valve member in a direction in which the valve member blocks the opening of the housing, the fourth communication passage serves as a stationary orifice for the flow of the fluid in one direction by the first and second relief valves, and the valve members are opened by the pressure difference of the flow in the reverse direction. Thus, it is possible to smoothly control the pilot pressure.

When the damping force adjustment mechanism is configured such that the actuator includes: a linear solenoid mounted in the housing; and a plunger configured to operate the second member in response to excitation of the linear solenoid, it is possible to appropriately and smoothly control the pilot pressure.

When the damping force adjustment mechanism is configured such that the casing is configured as a cylindrical body that accommodates the working fluid therein, the housing and the seal member are respectively configured by a piston that slides in the cylindrical body and divides an interior of the cylindrical body into an upper chamber, which is the first fluid chamber, and a lower chamber, which is the second fluid chamber, and a seal member which is mounted on the piston, and a damping force is adjusted by controlling the working fluid that flows through the piston in the cylindrical body, it is possible to provide a damping force adjustment mechanism suitable for a shock absorber for an automobile.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A damping force adjustment mechanism comprising a casing that accommodates a working fluid, a seal member that divides an interior of the casing into a first fluid chamber and a second fluid chamber, and a housing that holds the seal member and is accommodated in the casing, and adjusting a damping force of the working fluid in the housing, the damping force adjustment mechanism further comprising:
   a damping valve accommodated in the housing and configured to control opening and closing a space between the first fluid chamber and the second fluid chamber;
   a first pilot chamber and a second pilot chamber formed in the housing and separated from each other by the damping valve;
   a control chamber formed in the housing and configured to communicate with the first pilot chamber and the second pilot chamber;
   a control valve dividing an interior of the control chamber into a first control chamber that communicates with the first pilot chamber and a second control chamber that communicates with the second pilot chamber, and configured to select a fluid flow from the first control chamber to the second control chamber or a fluid flow in a reverse direction to the fluid flow depending on magnitudes of fluid pressures in the first control chamber and the second control chamber;
   an actuator configured to electrically drive and control the control valve so as to control the fluid pressure in the first pilot chamber or the second pilot chamber;
   a first communication passage configured to cause the first fluid chamber to communicate with the second pilot chamber;
   a second communication passage configured to cause the second fluid chamber to communicate with the first pilot chamber;
   a first stationary orifice provided in the first communication passage;
   a second stationary orifice provided in the second communication passage; and
   a third stationary orifice provided in a third communication passage provided in the control valve and configured to cause the first pilot chamber and the second pilot chamber to communicate with each other when at least the actuator is not driven,
   wherein the control valve includes:
      a holding member disposed in the housing and having the third stationary orifice;
      a first member disposed at the first pilot chamber side of the holding member and having a flow path configured to cause the first control chamber to communicate with the first pilot chamber; and
      a second member disposed at the second control chamber side to be in contact with the first member and having a flow path that causes the second control chamber to communicate with the second pilot chamber, the second member being configured to be driven by the actuator, and
   the first control chamber and the second control chamber are configured to communicate with each other through a gap between the second member and the first member, and the first pilot chamber and the second pilot chamber communicate with each other through the third stationary orifice when the actuator is not driven.

2. The damping force adjustment mechanism according to claim 1,
   wherein the holding member is a bottomed cylindrical body having the third stationary orifice in a sidewall portion thereof,
   the first member is disposed at an opening end side of the holding member and has a first flow path configured to cause the first control chamber to communicate with the first pilot chamber,
   the second member is slidably accommodated in the holding member so as to be disposed to come into contact with a bottom portion of the bottomed cylindrical body and the first member, and has a second flow path that causes the first pilot chamber to communicate with the second pilot chamber when a bottom portion space is formed in the bottomed cylindrical body, and
   when the second member comes into contact with the bottom portion in the bottomed cylindrical body, the second flow path is blocked by the second member, and the first pilot chamber and the second pilot chamber communicate with each other only through the third stationary orifice, and
   a return spring is interposed between the first member and the second member to bias the first member and the second member in a direction in which the space between the first member and the second member is spread and opened.

3. The damping force adjustment mechanism according to claim 1, further comprising:

a first relief valve having a valve member disposed to block an opening of a fourth communication passage formed in the damping valve, and a relief spring configured to bias the valve member in a direction in which the valve member blocks the opening of the fourth communication passage; and a second relief valve having a valve member disposed to block an opening of the housing configured to communicate with the second pilot chamber, and a second relief spring configured to bias the valve member in a direction in which the valve member blocks the opening of the housing.

4. The damping force adjustment mechanism according to claim 1,
wherein the actuator includes:
a linear solenoid mounted in the housing; and
a plunger configured to operate the second member in response to excitation of the linear solenoid.

5. The damping force adjustment mechanism according to claim 1,
wherein the casing is configured as a cylindrical body that accommodates the working fluid therein,
the housing and the seal member are respectively configured by
a piston that slides in the cylindrical body and divides an interior of the cylindrical body into an upper chamber, which is the first fluid chamber, and a lower chamber, which is the second fluid chamber, and a seal member which is mounted on the piston, and
a damping force is adjusted by controlling the working fluid that flows through the piston in the cylindrical body.

* * * * *